Nov. 10, 1925.                                              1,560,669
                       J. H. DENNEDY
                     PACKING FOR SHAFTS
                     Filed Aug. 29, 1921
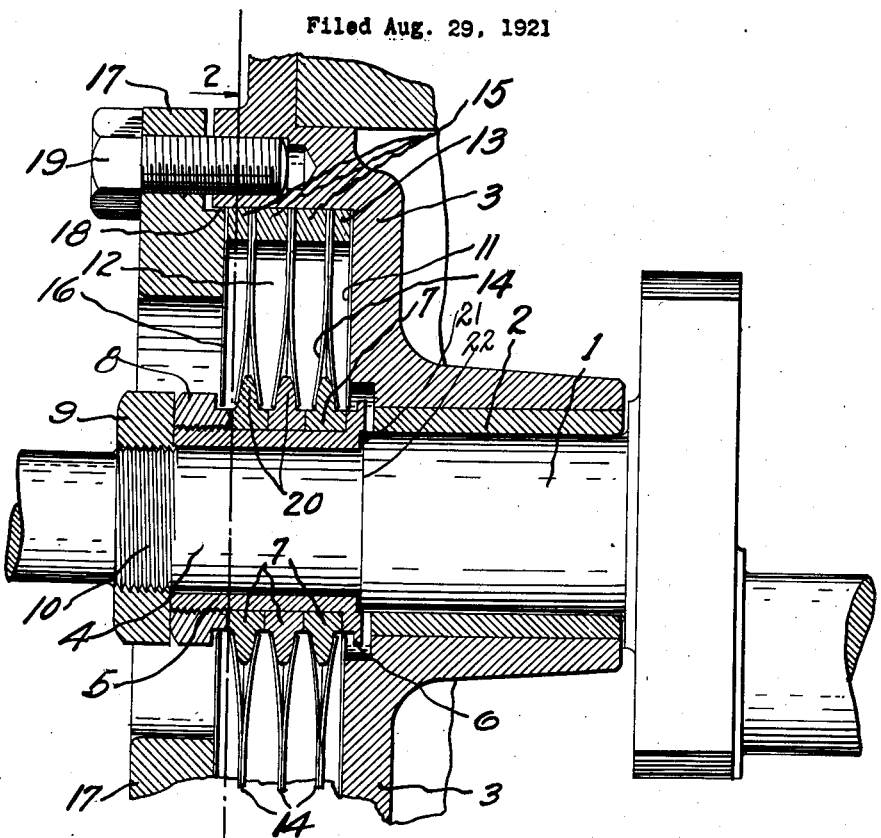
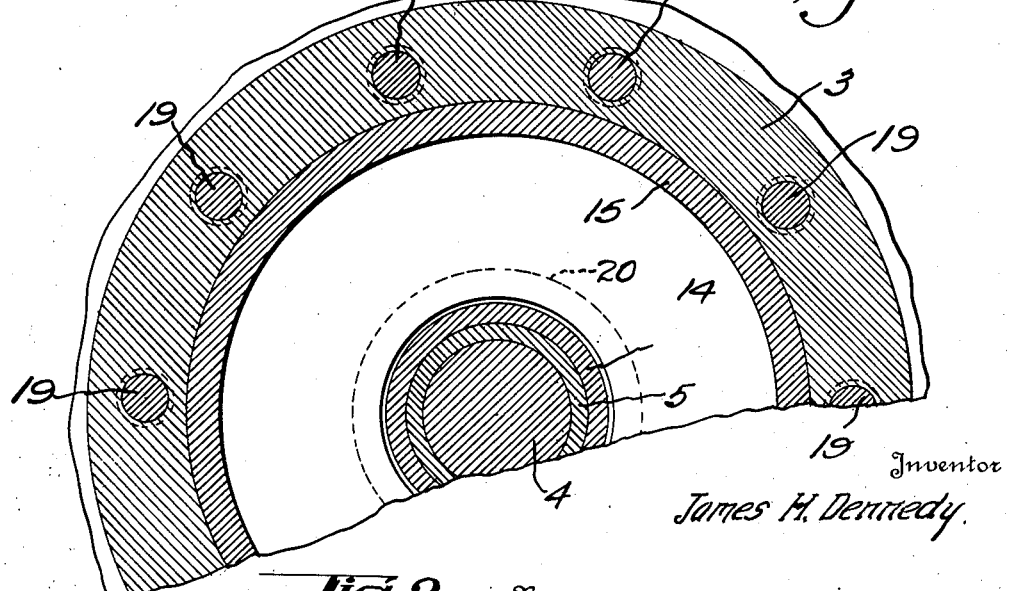
Inventor
James H. Dennedy.
By
Charles E. Winn
Attorney Patented Nov. 10, 1925.

1,560,669

UNITED STATES PATENT OFFICE.

JAMES H. DENNEDY, OF DETROIT, MICHIGAN.

PACKING FOR SHAFTS.

Application filed August 29, 1921. Serial No. 496,289.

*To all whom it may concern:*

Be it known that I, JAMES H. DENNEDY, citizen of the United States, residing at Detroit, county of Wayne, State of Michigan, have invented a certain new and useful Improvement in Packings for Shafts, and declare the following to be a full, clear, and exact description of the same, such as will enable others skilled in the art to which it pertains to make and use the same, reference being had to the accompanying drawings, which form a part of this specification.

This invention relates to packing for shafts and the object of the invention is to provide a device for preventing leakage of liquid or gas along a shaft. This invention is particularly adapted for use on the shafts of compressors in refrigerating systems for preventing leakage of the refrigerant, such as ammonia gas, sulphur dioxide or the like, the loss of which is very great where no provision is made to prevent such leakage. Another reason for preventing this leakage is that ammonia gas or sulphur dioxide when existing in any quantity in a closed room is injurious to persons and, should the leakage occur within the refrigerator the food therein is contaminated thereby. This invention is further adapted for preventing leakage of the refrigerant even when under considerable pressure and also packs the shaft against leakage of lubricating oil or the ingress of air. A further object of the invention is to provide a metallic packing which will remain tight under all conditions of temperature and pressure and which is so designed as to be easily assembled or removed. These objects and the several novel features of the invention are hereinafter more fully described and claimed, and the preferred form of construction of a packing by which these objects are attained is shown in the accompanying drawing in which—

Fig. 1 is a section through the main bearing of the crank shaft of a compressor showing my improved packing.

Fig. 2 is a section taken on line 2—2 of Fig. 1.

As shown in Fig. 1 a crank shaft 1 is provided to which the connecting rods of the compressor may be attached. The crank shaft 1 is rotatably mounted in a bearing 2 which is provided in the crank case 3 of the compressor, the end of the crank case being recessed as shown in Fig. 1 to receive the packing. The crank shaft is provided with a portion 4 of smaller diameter and a sleeve 5 is positioned thereon, the said sleeve being provided with an annular flange 6 at the end. A gasket 21 is provided between the shoulder 22 of the shaft and end of the sleeve 5 to prevent leakage between the sleeve and the shaft. A series of three annular members 7 are positioned on the sleeve 5, the inner faces of the said members closely fitting the outer face of the sleeve, and the abutting faces of the said members are finished to provide a close fit. The abutting faces of the flange 6 and adjacent member 7 are also finished in like manner and a nut 8 is threaded on the threaded end of the sleeve 5 to bind the members 7 between the said nut and the flange 6. A lock nut 9 is threaded on the threaded portion 10 of the crank shaft and is adapted to force the sleeve 5 forward and bind the gasket 21 between the sleeve 5 and shoulder 22 and thus prevent leakage between the portion 4 of the shaft and the sleeve 5. An apertured metallic disc 11 is positioned on the face of the crank case 3 within the recess 12 and a ring 13 is positioned thereon. As will be seen from Fig. 1 there are three pairs of discs 14 spaced apart by the rings 15 which fit closely within the circular face of the recess 12. An apertured metal disc 16 is positioned over the outer ring 15 and a clamp member 17 having an annular shoulder 18 is secured to the crank case 3 by the bolts 19. A series of bolts 19 is provided as shown in Fig. 2 and as the bolts are drawn up the shoulder 18 of the member 17 is forced inwardly which binds the discs 11, 14 and 16 between the rings 13 and 15 and the shoulder 18. It can thus be seen that by drawing the bolts 19 up tightly, the possibility of leakage around the outer periphery of the discs is prevented.

The annular members 7 are each provided with a circular rib 20 having oppositely curved faces which are highly polished and against which the faces of the discs about the center engage as shown in Fig. 1. This spread of the discs by the ribs 20 is resisted due to the discs being formed of flat tempered spring steel and on this account the discs tend to return to the flat position and therefore engage the curved faces of the ribs 20 with sufficient tension to prevent leakage therebetween. It will be noted that when bindingly secured in place between the members 15 and 13, the discs 14 are held stationary, while the ribs 20 may rotate therebetween. Should the bearing 2 become worn the refrigerant may pass between the said bearing and the crank shaft 1 and might pass between the first pair of discs 14 and rib 20 but due to the tension of the discs on the ribs the refrigerant will be prevented from passing through the entire series of discs. It can thus be seen that by this construction leakage in either direction will be prevented even when the refrigerant is under considerable pressure in which case the pressure would only force the first of the series of discs 14 into tighter engagement with the companion rib 20. It will also be noted that with this construction leakage is prevented even when there is considerable play in the shaft both radially and longitudinally and due to the tension of the discs 14 on the faces of the ribs a tight packing is always maintained.

It can also be seen from this construction that leakage of gas is resisted in steps, that is, the pressure might be considerable between the inner edge of the recess and the first of the series of discs and a very slight leakage could occur between the first disc and rib, but the pressure in the space between the discs about the first rib would be considerably less because of the resistance to the flow of gas set up by the pressure of the first disc on the corresponding rib, and the pressure in the chambers formed between the pairs of discs would be increasingly less down to atmospheric pressure so that by multiplying the number of discs, a number of resistance points or throttle points are formed and all possibility of leakage will be prevented. It is also understood that a single disc and single rib may be utilized in which case if the packing is intended for use against pressure from the interior the single disc would be applied to the right hand side of the rib, the rib being so positioned that the disc is deflected at the center similar to those on the right sides of the ribs shown in Fig. 1. This type of packing may be utilized for packing against steam or liquid or where an absolutely tight packing is not necessary. In this case the pressure would merely force the disc into tighter engagement with the rib. A single disc may also be used for packing against a vacuum, in which case the disc would merely be positioned on the opposite side of the rib, it being necessary of course to deflect the disc at the center to provide proper tension and allow slight play of the shaft longitudinally. In this case the tendency of the air to rush in would force the single disc into tight engagement with the side of the rib and thereby prevent the ingress of air or other fluid.

From the foregoing description it becomes evident that the device is very simple and efficient in operation, will not get out of order, is easily assembled or disassembled and provides a device which accomplishes the objects described.

Having thus fully described my invention, its utility and mode of operation, what I claim and desire to secure by Letters Patent of the United States is—

1. In a packing for shafts, in combination, a casing having a recess, a shaft extending through the said recess, a series of centrally apertured spring metal discs arranged in pairs and fitting within the said recess, a series of metal rings fitting within the recess and spacing the pairs of discs at the periphery, a clamp member having an annular shoulder adapted to fit in the recess, means for drawing the shoulder into the recess to bind the rings and discs between the shoulder and bottom of the recess, a sleeve secured to the shaft within the recess and having an annular shoulder, a series of annular rib members seating on the said sleeve extending between and spreading each pair of discs at the center, a nut threaded on the sleeve adapted to bind the rib members between the annular shoulder of the sleeve and the said nut and a lock nut threaded on the shaft and adapted to bindingly engage the nut on the sleeve.

2. In a packing for shafts, in combination, a casing having a recess, a shaft extending centrally through the said recess, a series of centrally apertured spring metal discs arranged in pairs and fitting within the said recess, a series of metal rings spacing the pairs of discs at the periphery, a clamp member provided with an annular shoulder adapted to fit in the recess, means for drawing the clamp member into the recess to bind the rings and discs between the annular shoulder and bottom of the recess, and a series of annular rib members extending between and spreading each pair of discs at the center.

3. In a packing for shafts, in combination, a casing having a recess, a shaft extending centrally through the said recess, a series of centrally apertured spring metal discs arranged in pairs and fitting within the said recess, a series of metal rings spacing the pairs of discs at the periphery, means for bindingly securing the rings and discs in place, a sleeve secured to the said shaft, a series of annular rib members mounted on the said sleeve, means for bindingly securing the rib members in position on the sleeve, the rib members extending between and spreading each pair of discs at the center.

4. In a packing for shafts, in combination, a casing having a recess, a shaft extending centrally through the said recess, a series of centrally apertured spring metal discs arranged in pairs and fitting within the said recess, a series of metal rings spacing the pairs of discs at the periphery, means for bindingly securing the rings and discs together at the periphery, and a series of annular rib members on the shaft and spreading the discs of each of said pairs about their central apertures.

5. In a packing for shafts, in combination, a casing having a recess, a shaft extending centrally through the said recess, a series of centrally apertured spring metal discs arranged in pairs and fitting within the recess, the discs of each pair being stationarily mounted in the casing and sealed together at the periphery thereto, a series of annular rib members mounted to rotate with the shaft and sealed thereto, the said rib members extending between and spacing the discs of each pair at the center.

6. A packing for shafts comprising in combination a casing, a shaft extending therethrough, a series of centrally apertured diaphragm discs arranged in pairs and secured together at their peripheries to the casing, the several discs being so arranged that the discs of each pair are closer together than are the pairs of discs, and a series of annular rib members on the shaft arranged for spreading the discs of each pair at their central apertures and for making rotary seals therewith.

7. A packing for shafts comprising a shaft, an apertured casing through which the shaft extends, the shaft and casing constituting respectively rotary and stationary elements, a pair of normally flat diaphragm discs of spring metal having central apertures thereby forming an inner and an outer margin for each disc, the pair of discs being secured together and sealed to one of the elements at one of their margins, and an annular flange on the other of the elements extending between the discs at their other margins to spread them apart against their normal tendency to remain flat and thereby making rotary contact with the discs.

In testimony whereof, I sign this specification.

JAMES H. DENNEDY.